(12) United States Patent
Burr

(10) Patent No.: US 7,877,882 B2
(45) Date of Patent: Feb. 1, 2011

(54) THREAD GAUGE CHECKER

(75) Inventor: William Burr, Bensenville, IL (US)

(73) Assignee: S&W Manufacturing Co., Inc., Bensenville, IL (US)

( * ) Notice: Subject to any disclaimer, the term of this patent is extended or adjusted under 35 U.S.C. 154(b) by 0 days.

(21) Appl. No.: 12/416,818

(22) Filed: Apr. 1, 2009

(65) Prior Publication Data

US 2010/0251556 A1    Oct. 7, 2010

(51) Int. Cl.
     *G01B 5/16*      (2006.01)
     *G01B 1/00*      (2006.01)

(52) U.S. Cl. .................................... 33/199 R

(58) Field of Classification Search ............... 33/199 R, 33/562–565, 501.05, 501.08, 555.2, 548
See application file for complete search history.

(56) References Cited

U.S. PATENT DOCUMENTS

| | | | | | |
|---|---|---|---|---|---|
| 1,881,651 | A | * | 10/1932 | Judge ........................ | 33/562 |
| 2,528,431 | A | * | 10/1950 | Greenberg ................ | 33/199 R |
| 2,604,702 | A | * | 7/1952 | Collins ...................... | 33/565 |
| 2,728,145 | A | * | 12/1955 | Holladay .................. | 33/199 R |
| 2,822,624 | A | | 2/1958 | Klink | |
| 3,218,724 | A | * | 11/1965 | Schaumberger ........... | 33/199 R |
| 3,406,461 | A | * | 10/1968 | Gunderson ................ | 33/199 R |
| 3,858,325 | A | * | 1/1975 | Goerler .................... | 33/199 R |
| D249,124 | S | * | 8/1978 | Oberg ........................ | D10/64 |
| 4,138,820 | A | * | 2/1979 | O'Connor .................. | 33/562 |
| D278,691 | S | * | 5/1985 | Sorrell ...................... | D10/64 |
| 4,524,524 | A | | 6/1985 | Frank et al. | |
| 4,611,404 | A | | 9/1986 | Arsenault | |
| 5,020,230 | A | | 6/1991 | Greenslade | |
| 5,131,162 | A | * | 7/1992 | Miller ........................ | 33/562 |
| 5,182,862 | A | | 2/1993 | Frank et al. | |
| D366,843 | S | * | 2/1996 | Rosenstein .................. | D10/64 |
| D421,575 | S | * | 3/2000 | Palm .......................... | D10/64 |
| D454,509 | S | * | 3/2002 | Chiang ...................... | D10/64 |
| 7,343,685 | B1 | | 3/2008 | Sorensen | |
| 7,356,935 | B2 | | 4/2008 | Navarro, Sr. et al. | |
| 7,607,237 | B2 | * | 10/2009 | Schafer .................... | 33/501.45 |

* cited by examiner

*Primary Examiner*—Yaritza Guadalupe-McCall
(74) *Attorney, Agent, or Firm*—Edelson IP Law Group, Ltd.; Leon I. Edelson

(57) ABSTRACT

A method is disclosed for measuring the threads of standard and metric female thread bolt and standard and metric male thread nut of must commonly used nuts and bolts and the screw diameters in sizes #0 to #14. A separate set of plug gauges and ring gauges match the thread sizes of both the said standard female and metric female thread bolt gauge sizes. Separate standard and metric thread nut thread sizes are present in separate plug and ring gauges to provide ready gauges to measure threads of bolts and nuts not conveniently measure by plug and ring gauges mounted on a display wall structure for protection of the said gauges for dirt and contaminants. The wall mounted display structure provides an immediately available device for checking thread sizes of nuts and bolts.

9 Claims, 3 Drawing Sheets

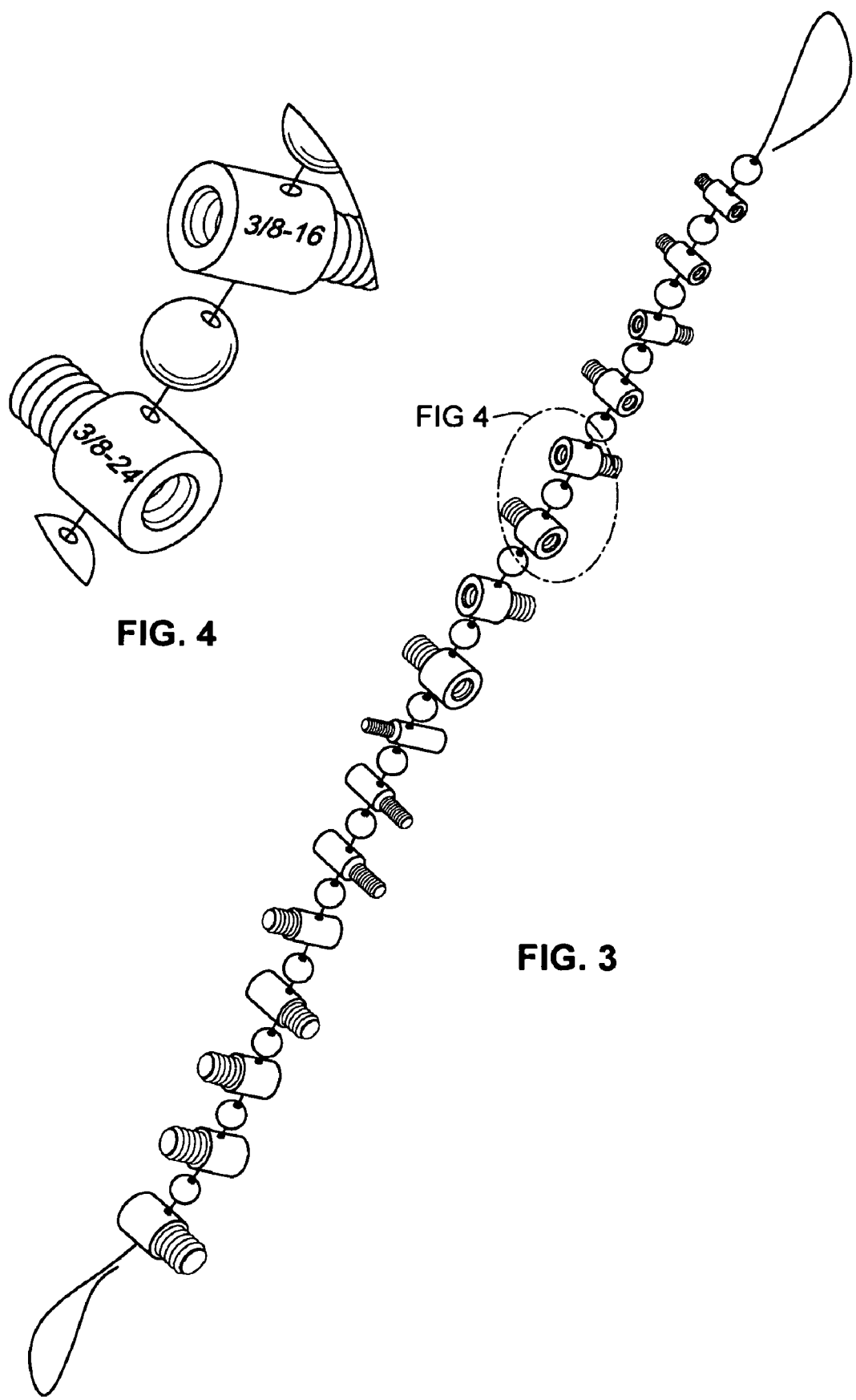

THREAD GAUGE CHECKER

The present invention relates to a wall mounted ready-to-use female thread bolt checker, a wall mounted male thread nut checker and a screw diameter checker in standard and metric thread sizes and to a method for use of a separate metric thread checker to verify the results of the female thread bolt checker and the male nut checker. The standard threads are in clear zinc finish and the metric threads are in black oxide finish. Furthermore, the instant invention provides a ready method for identifying damaged threads of fasteners by rotating threaded nuts and bolts to determine resistance to rotation of the threaded fasteners. The wall mounted thread gauge checker provides an immediately available device for checking thread of bolts and nuts.

BACKGROUND

Threaded fasteners are used in many applications and are available in several thread forms. The several thread forms in use can require rapid determination of component thread acceptability of individual fastener components in production activities.

Proper performance and extended service life of the several components of a product requires the connections between the components be strong, durable and tight. It is therefore important that the ready verifiable classification of available threaded forms be available as to threaded forms of fasteners components. A ready to use thread checker of nuts and bolts that is conveniently available can be a useful tool. The present invitation provides a wall mounted thread checker of standard and metric thread sizes in conjunction with a separate set of gauges which serve as a method to verify the gauge results of the wall-mounted thread checker.

A number of different dimensions pertaining to thread sizes are of critical importance. Standards as to dimension have been determined for thread values including thread lead, thread height, thread angle, thread taper, and pitch diameter. The quality of individual fasteners may be assessed though comparing the thread characteristics of a fastener to maximum and minimum levels of acceptance. However, the degree to which quality of a fastener may be determined frequently depends on the time required to make the assessment. One minute may be required to accurately gauge a fastener's dimensions. Conventionally it may be necessary to make trade offs between quality control and production speed, thereby using fewer measurements then would be advantageous for full quality assurance. The instant invention provides a means complying with a lessened standard of quality assurance but meets specified standards as to dimensions reality checked.

A number of gauge systems have been developed for measuring the inside and outside of threaded fasteners surfaces. In the gas and oil production industry, the American Petroleum Institute (API) has adopted specifications for threading, gauging and thread inspection of components used in the industry. In specifying the standard dimensions for the various thread parameters, the API specifications provide a procedure for checking the accuracy of actual thread measurements and parameters as compared with design dimensions. The procedure, which is accepted and used by the Petroleum Industry utilizes a series of ring and plug gauges to check the accuracy of the actual threads against the API standard thread for the particular thread configuration and threaded product.

The ring and plug gauge system is known as a "go and not go" gauge system. The plug gauge as a gauge device usually has a double end, having a "go" end and a "not" go end. When the tested piece is of the correct size, one of the gauges will slip into the test article and the other end will not. A ring gauge is a standard cylindrical gauge (male and female). The ring or external gauge is a bored ring and is made in both a "go" and "not go" dimension.

Ring and plug gauges systems have a certain inherent shortcoming. Rings and plugs do not directly measure the individual thread parameters such as pitch diameter. Ring and plug gauges can measure only the functional fit of the threads. Also ring and plug gauges can measure accurately only perfectly formed threads.

Despite these shortcomings, ring and plug gauges comprise the only API approved gauging system for measuring the functional fit of the tapered threads.

Indicating thread gauges are available for proving a direct read out of the thread parameter being measured. U.S. Pat. Nos. 3,859,730, 4,672,750, 5,048,197, 6,055,329, 6,111,601; and 7,343,034 disclose and teach tools and apparatus for thread measurement and qualifying fastener devices. Typically, these devices utilize tools and procedures not adapted for ready evaluation of fastener threads on the bases of go and not go dimensions.

Additionally, the core methods of use and maintenance of thread plug gauges and cylindrical contain ring gauges require that the gauge user provides a certain minimum level of care to insure accurate and clean gauges.

The thread plug gauges and cylindrical ring gauges are manufactured to precise tolerances. Typically the gauge surfaces have a clear finish and are made to ANSI standards for gauges for both plug and ring gauges. Because heat, moisture, abrasions, metal chips, dirt, and oil can impair accurate reading, core standards are frequently used for test gauges to protect and prolong the useful life of the individual plug and ring gauges.

For example, manufacturers of plug and ring gauges recommend that:
1) Soft clean individual clothes be used to keep the individual gauges free from contact with dirt of oil for long periods of time. Oils containing dirt can damage the polished surface of the plug or ring gauge.
2) A soft non-abrasive clean cloth is recommended be used to wipe each gauge clean before and after each use.
3) The gauges are best stored in a dry and cool atmosphere, away from sunlight or any intense heat.

The presence of heat can cause the gauges to expand and then contract when cool, to provide incorrect measurements when so used.

4) Inspection gauges be kept away from operators using inspection gauges to check work in progress, operations may force the inspection gauges into or over the work piece to quickly damage the precise tolerances.

The methods of use and of maintenance of plug and ring gauges accordantly are of significance in the wear life and performance required of the gauges, and are provided by the display structure of the instant invention.

In the prior art, a number of devices and procedures are used for measuring threads. U.S. Pat. No. 2,822,624 teaches a three-wire method for measuring threads using a wire holder to hold the gauging wires used in the three wire method to eliminate the difficulty of handling the three wires.

U.S. Pat. No. 3,218,724 teaches and claims a thread gauge unit comprising two gauge plates. The first gauge plate carries a plurality of gauging studs of different thread size and diameter and others of different thread size and the same diameter. The second gauge plate also contains a plurality of threaded opening, each opening receiving in threaded engagement therewith a gauging stud of a corresponding thread size and diameter of the first gauge plate. Identifying indicia indicating the thread size and diameter of each gauging stud are marked on the surfaces of the first gauge plate and on both surfaces of the second gauge plate of each threaded opening. In use, the threaded studs of the first gauge plate form a gauging element for gauging the threads of an applied nut. Meshing of the threads of a bolt or screw against the threads of a stud indicates the thread size of the screw or bolt. Selection of the proper threaded opening in the second gauge plate will indicate the thread size of the inserted screw or both. The two gauge plates are secured together by threaded engagement of the first plate studs with corresponding threaded openings in the second plate for transport or storage. However, such an arrangement for storage and transport hinders the ready accessibility of the two gauge plates for use of measuring threads of separate screws and or bolts.

U.S. Pat. No. 5,182,862 teaches and claims and indicating thread gauge wherein thread form elements engage its threaded product while an indicator transduces radial displacement of the thread form elements. The thread form elements engage the thread form of the threaded product. A thread form element can be a thread role or thread segment that can rotate the thread form element to engage the thread form of the threaded product. The indicating thread gauge device is cumbersome and not suitable for ready evaluation of small handable screw thread bolts and crew thread nuts.

U.S. Pat. No. 4,611,404 teaches and claims a caliper for thread measurement where the caliper has a body of at least two cooperating members having a combination structure attached to each member and having a contour of the object being measured by the caliper. Application of the contour to the object being measured permits measurement of the threads of the objects being measured and is particularly useful in measuring thread diameters on large pieces of equipment.

U.S. Pat. No. 7,343,685 discloses and claims a thread verification and checking apparatus and methods for threaded bores in small plastic parts in which a threaded top is mounted to rotate on a fixed access at a workstation. The parts' threaded bore is verified and verified, at which point the part engages a reversing limit to drive the verified part back of the top.

It is the object this invention to provide a thread gauging device to enable the ready ascertaining of the size of the thread of a bolt or shaft as well as the size of the thread of a nut.

It is also the principal object of this invention to provide a means of ready access to plug gauges mounted on a support display structure as a device, which readily identifies the thread size wherein the precision tolerances standards of the plug gauges are not impaired by the presence of metal chips, dirt and surface oil containing dirt.

It is also an object of this invention to provide mounted displayed ring gauges to be easily available for checking thread sizes of cylindrical objects and nuts wherein the precision tolerance standards of the ring gauges are not impaired by the presence of metal chips, dirt, and surface oil containing dirt.

It is also an object of this invention to provide a ready means of identifying thread sizes of cylindrical objects such as shafts and bolts and interior thread sizes of bore holes wherein the test object can be brought to the ring or plug gauge mounted upon a support surface.

It is also an object of this invention to provide a separate series of ring gauges on the bore interior surfaces of the mounted plug gauges of both the standard and metric plug gauges. The interiors of the plug gauges are bored to precision standards to provide separate means of measuring thread sizes of bolts and other cylindrical objects.

As a separate means of checking the threat of nuts and bolts checked by means of the wall mounted thread checker, the plug and ring gauges mounted upon the support structures are separately assembled as individual units upon a wire lanyard. The individual gauges comprise a combined plug gauge and a ring gauge in each embodiment. Each embodiment comprises a plug gauge with a threaded projecting end which is used to check internal thread and a second end which has an interior threaded diameter which is used to check the threaded surface of a bolt or cylindrical object.

The thread identifying numbers of the individual gauges embodied as separate plug and ring gauges match the thread identifying numbers of the individual plug and ring gauges mounted upon the thread checker structure as a plug in ring gauge support unit. The separate embodiments of the plug and ring gauges mounted upon the gauge support unit permit the user to verify the thread dimensions of threaded objects not conveniently measured by plug and ring gauges mounted upon the support structure.

SUMMARY OF THE INVENTION

The instant invention comprises a method and easily available device and apparatus for checking the threads of bolts and nuts in ready and easily available plug and ring gauges supported on a structure that provides convenient verification of standard and metric thread sizes. The plug and ring gauges are mounted components of a wall mounted device as a single plug and ring center which identifies sixteen standard female thread bolt checkers, sixteen standard male thread nut checkers, twelve metric female thread bolt checkers, twelve metric thread nut checkers and checks ten screw diameters. Separate individual device embodiments of combined plug and ring gauge units duplicate the mounted plug and ring gauges for easy off site verification of thread sizes of objects not easily transported to be applied to the wall mounted gauges.

BRIEF DESCRIPTION OF THE DRAWINGS

FIG. 3 is a perspective view of the alternate embodiment of the thread (gauge) checker, the thread checker lanyard containing the individual standard female and male bolt and nut thread gauges and the metric female and male bolt and nut thread gauges display structure as an easily available device for checking thread sizes.

FIG. 4 is a enlarged perspective view taken from FIG. 3 of an alternate embodiment of the present invention of the thread (gauge) checker.

DETAILED DESCRIPTION OF THE INVENTION

Figure 1:
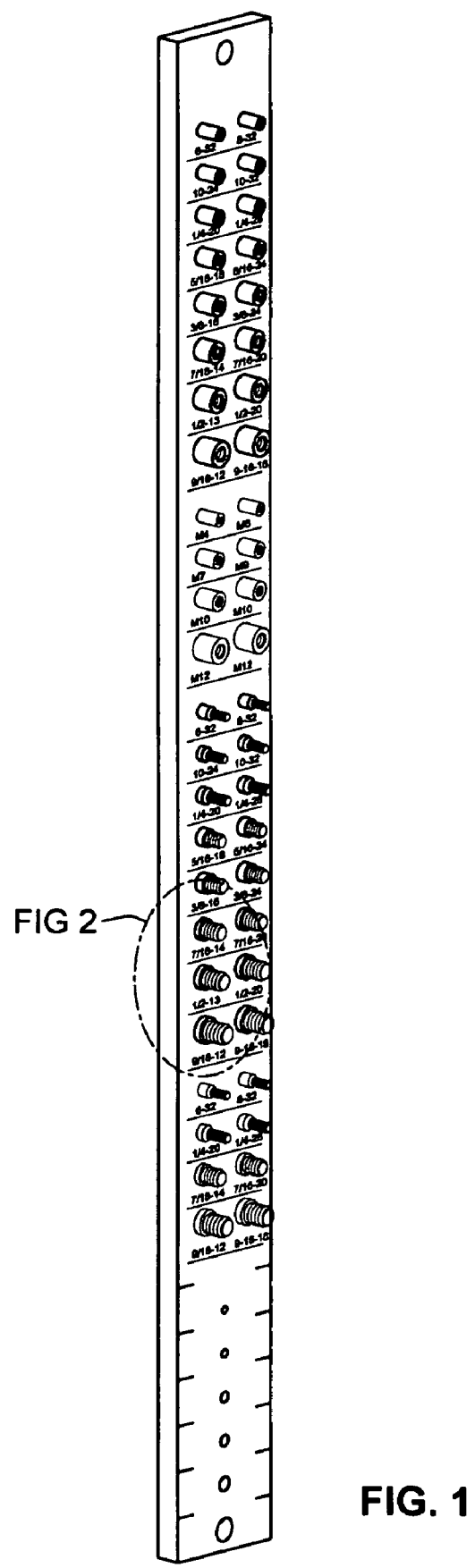
FIG. 1 is a perspective view of the present invention showing the primary embodiment of the thread (gauge) checker, including the thread checker wall support unit containing the individual standard female and male bolt and nut thread gauges and the metric female and male bolt and nut thread gauges display structure as an easily available device for checking thread sizes.
Figure 2:
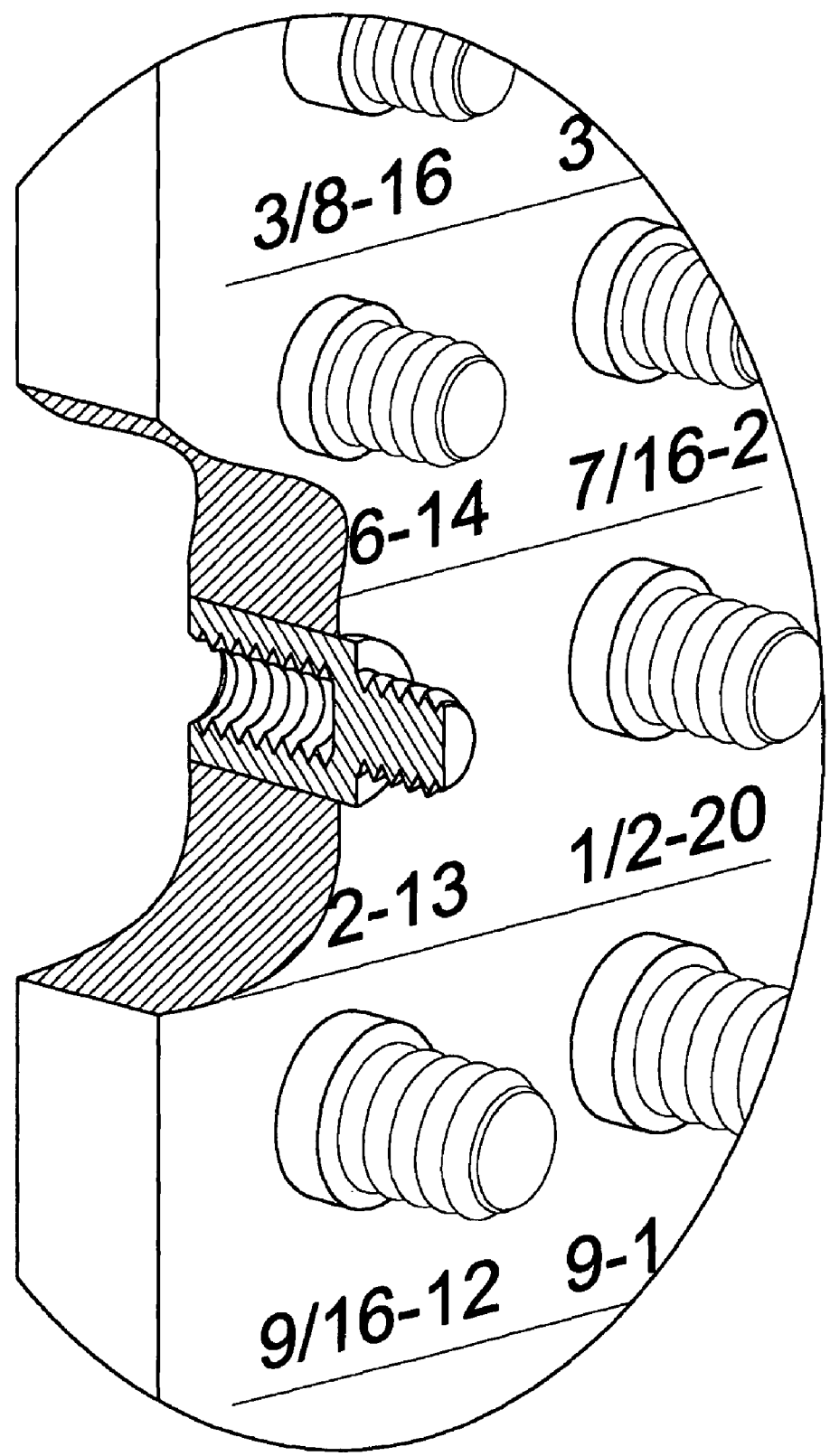
FIG. 2 is an enlarged cross section of FIG. 1 of the present invention of the thread (gauge) checker.

As shown in FIGS. 1 and 2, the invention is a thread gauging device for checking internal threads with plug gauge and external threads with ring gauges wherein immediate availability of plug gauges of different gauges dimensions and immediate availability of ring gauges of different gauge dimensions provides ready, easy verification of thread sizes in standard and metric dimensions in a ready procedure.

Referring to FIG. 1, the standard male thread nut checker comprises a standard male thread checked by a plug gauge which checks the thread of applied nuts to the extended plug thread surface. The sizes of threads checked by applying individual units to the plug gauges are sizes from 6-32 to ½-30.

The plug gauges also comprise an internal thread checker for checking bolt thread sizes of from 6-32 to ½-30 in the opposite end of the plug gauge comprising the reverse plug gauge opening.

In use, the male plug gauge serves to gauge the thread gauge of nuts from 6-32 to ½-30 thread sizes of the tested ring. Conversely, the plug gauge unit is mounted on the support structure so that the reverse end of the plug gauge is positioned to permit thread checking of bolt threads by insertion of the threaded bolt end into the threaded cavity of the protruding plug gauge which also has the threaded cavity within the structure of the plug gauge in the same thread checking dimensions of the threaded ring gauge. The same internal thread dimensions of the plug gauge check the thread internal dimensions of a ring gauge.

The metric male thread not checker also provides an internal cavity within the metric male thread checker wherein the threaded cavities of the metric male thread nut checker provide a convenient metric male bolt thread checker of the same thread sizes as the metric male thread nut checker sizes M4×0.7 to M12−1.75 of the inserted bolt threads.

In application, the availability of plug and ring gauges of different thread dimensions permits a procedure of "go" and "not go" measurements within the tolerance allowance of a "go" plug or ring gauge permits a ready means of classifying screw threads of rings and bolts.

"Not go" and "go" gauges rely on the ability of the test plug and ring gauge to allow the test thread of the ring or plug to freely contact the screw thread of the bolt in nut without binding.

Ring gauge devices are cylindrical rings of steel whose inside diameter are ground and then honed or tapped to gauge tolerances. The "not go" gauge will not pass over any part within tolerances but will pass over an undersized part. The "go" gauge will pass over the largest acceptable part but will not pass over any larger part. The "not go" plug gauge can be used for checking the diameter of a cylindrical cavity such a bolt hole or bearing bore. The materials dimensions and tolerances of a plug gauge are comparable to those of ring gauges. A single plug gauge controls one limit of tolerance of an inside diameter. Plug gauges are often used in pairs of a "go" and "not go" gauge.

The ready availability of a number of the plug and ring gauges for the most common size nuts and bolts in a single wall mounted thread checker permits the use of "not go" and "go" thread sizes in a readily available device. The presence of the female thread checker embodied in the internal cavity within the male standard and metric male threaded nut checker extends the thread checking ability of the device over the standard female thread bolt checker and metric thread bolt checker device and the standard and metric sizes for bolts contained therein.

Additionally, the thread checker device contains a screw diameter checker sizes 0 to #14. The device also contains a bolt length measurement device.

In summary, the instant invention provides a readily available bolt and ring thread checker device which mounts plug and ring gauges for checking the threads of common nuts and bolts in a single structure in standard and metric sizes as both female and male thread bolt and nut checkers. Each female and male thread bolt and nut checker mounted on the single structure is provided with a separate available individual combined plug and ring gauge for checking the internal and external threads of bolts and nuts to permit the user to verify the thread dimensions of threaded object not conveniently measured by plug and ring gauges mounted upon a support structure.

The plug and ring gauges are mounted upon a separate wall display structure to display the individual gauges and a physical form that is ready to use and stored in a manner that provides a clean area free from dirt, oil and contaminants that would damage the accuracy of the plug and ring gauges. The display structure comprises a heavy paper pasteboard printed with identifying indicia.

The presence of the separate set of individual plug and ring gauges which match the thread measurements of the mounted plug and ring gauges improves the versatility and utility of the mounted plug and ring gauge method by allowing the checking threads of individual female and male threaded bolts and threaded nuts not easily physically brought to the plug and ring gauges mounted upon the support display structure.

What it claimed is:

1. A method for checking standard and metric female thread bolt threads, male thread nuts, screw diameters and bolt lengths comprising threaded plug gauges and threaded ring gauges, further comprising a display wall structure mounting a standard female thread bolt and a metric female thread bolt checker comprising a series of standard and metric ring gauges and mounting a standard male thread nut checker and a metric thread nut checker comprising a series of plug gauges wherein each plug gauge is mounted with interior cavities in each plug gauge which matches the standard and metric female thread bolt thread bolt thread checker gauges also mounted as thread bolt checkers upon the said display structure;

wherein said method also comprises the separate presence of a series of plug and ring gauges assembled upon a wire lanyard which match the gauge sizes of the ring and plug gauges mounted of the said structure wherein the separate set of individual plug and ring gauges that match the plug and ring gauge's thread sizes provides ready verification of bolt and nut thread sized sizes not conveniently checked by the plug and ring gauges mounted on said display structure; and wherein the ring and plug gauge systems known as "go" and "not go" gauge system for measuring the inside and outside of threaded fastener surfaces per specifications adopted by the American Petroleum Institute (API) for threading, gauging, and thread inspection of functional fit of components used in the gas and oil industry by rotating ring gauges, threaded nuts and bolts to determine resistance to rotation of the threaded test device, each plug gauge having a double end as a "go" end and as a "not go" end in the plug gauge and the threaded internal cavities wherein the ring gauges are threaded as a cylindrical ring of steel whose inside diameters are ground and honed so that a "not go" ring gauge will not pass over any part outside tolerance, the ring gauges being bored rings made in both "go" and "not go" dimensions in a cavity at each end of the plug gauge, where each ring gauge's internal cavity is internally threaded as a cylindrical ring of steel whose inside diameter is ground and honed according to specifications so that the "not go" ring gauge will not pass over any over-tolerance threaded part over specifications, wherein said ring gauge is a bored ring made in both "go" and "not go" specifications.

2. The method of claim 1 wherein the bolt and nut thread checkers (and insert) standard and metric female thread bolt checkers and male thread nut checkers.

3. The method of claim 1 wherein the standard female thread bolt checker comprises thread sizes of 6-32 to ½-20.

4. The method of claim 1 wherein the metric female thread bolt checker comprises thread sizes M4×0.7 TO M12×1.75.

5. The method of claim 1 wherein the standard male thread nut checker comprises thread in sizes 6-32 to ½-20.

6. The method of claim 1 wherein the metric male thread nut checker comprises thread sizes M4×0.7 TO M12-1.75.

7. The method of claim 1 wherein the display wall structure comprises a screw diameter checker of sizes #0 to #14.

8. The method of claim 1 wherein the threaded internal cavities define a thread identifying member of the individual gauges embodied as separate plug and ring gauges of said display wall structure match the thread identifying numbers of the individual plug and ring gauges mounted on the thread checker structure.

9. The method of claim 1 wherein the display wall structure comprises plug and ring gauges mounted components which identifies sixteen standard female thread bolt checkers, sixteen standard male thread nut checkers, twelve metric female thread bolt checkers, twelve metric thread nut checkers and checks ten screw diameters by the presence of identifying indicia of the separate series of plug and ring gauges.

* * * * *